June 15, 1943.  E. G. GRANT  2,322,014
SHIP PROPULSION
Filed Aug. 27, 1941  3 Sheets-Sheet 1

Edmund G. Grant
INVENTOR.

ARRANGEMENT FOR #1 ENGINE

ARRANGEMENT FOR
2 ENGINE #5 OTHER HAND

ARRANGEMENT FOR
3 ENGINE #4 OTHER HAND

Edmund G. Grant
INVENTOR.

Patented June 15, 1943

2,322,014

UNITED STATES PATENT OFFICE 2,322,014

SHIP PROPULSION

Edmund G. Grant, South Pasadena, Calif.

Application August 27, 1941, Serial No. 408,473

17 Claims. (Cl. 115—34)

My invention relates broadly to an improvement in ship (watercraft) propulsion.

The first object of my improvement is to provide a means of driving large ships with small multiple prime movers such as small Diesel engines of a size in high production.

A second object of my invention is to provide a means of connecting a high speed prime mover to a low speed propeller shaft without precise and expensive gears.

A third object of my invention is to provide a resilient connection between the propulsion engines and the propeller shaft.

A fourth object of my improvement is to provide a means of reversing the propeller shaft without stopping and reversing the engines.

The fifth object of my invention is to provide a means of disconnecting the propeller shaft, the reversing mechanism, or the engine from drag while idling as is done with a sailing clutch.

The sixth object of my invention is to provide a means of accomplishing all of the above objects with one device.

Figure 1:
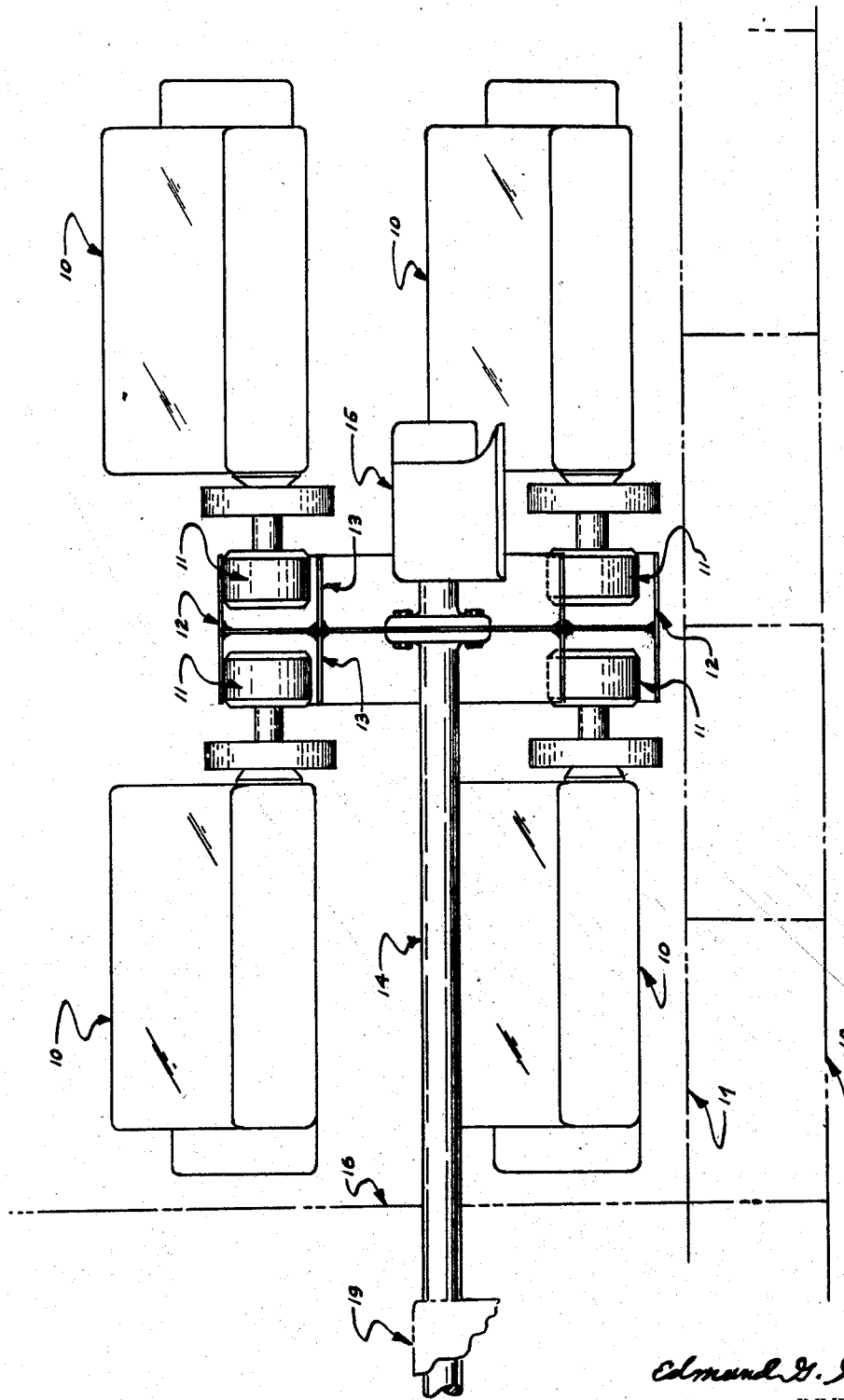
Fig. 1 is an inboard profile showing the arrangement in the engine room of two sets of five engines as illustrative of one possibility.

The engines 10 drive the propeller shaft 14 at reduced speed through a speed reduction device formed by rubber tires 11 direct connected to engines 10 driving through friction, the drum or driving wheel 12. The steady bearing 19 and the Kingsbury thrust bearing 15 support the driving wheel 12. As many driving wheels as required may be used by making short sections of shaft 14 and bolting additional driving wheels between the flanges. A driving wheel may be double as shown having engines on both sides or be single and be driven by a single group of engines.

Figure 3:
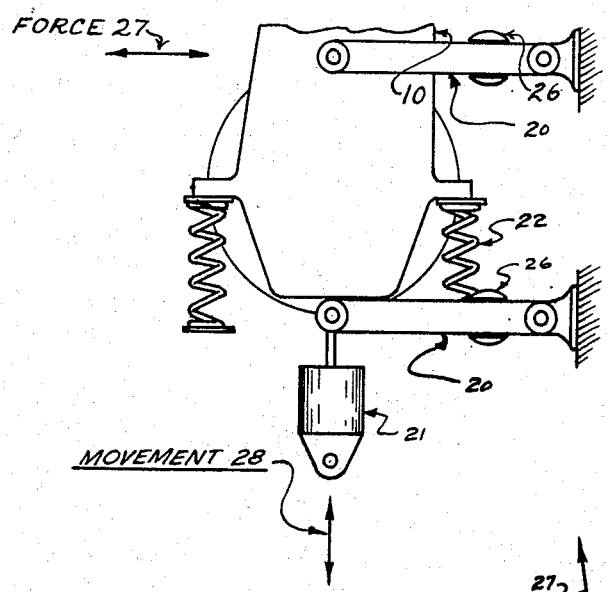
Fig. 3 is an end view showing the mounting of No. 1 engine in Fig. 2.

The engines 10 are supported as in Fig. 3 by hinged link 20. Pressure between driving wheel 12 and rubber wheel 11 is supplied by pressure cylinder 21. To reverse, the rubber wheel 11 is caused to bear on reversing ring 13 by cylinder 21 which is double acting. The neutral or idling position is maintained by holding the rubber wheel 11 half way between driving ring 12 and reversing ring 13.

Steel springs 22 take the weight of the engine off of the hinge 20 and cylinder 21.

Hinged links 20 are connected together by torque tube 26.

Figure 2:
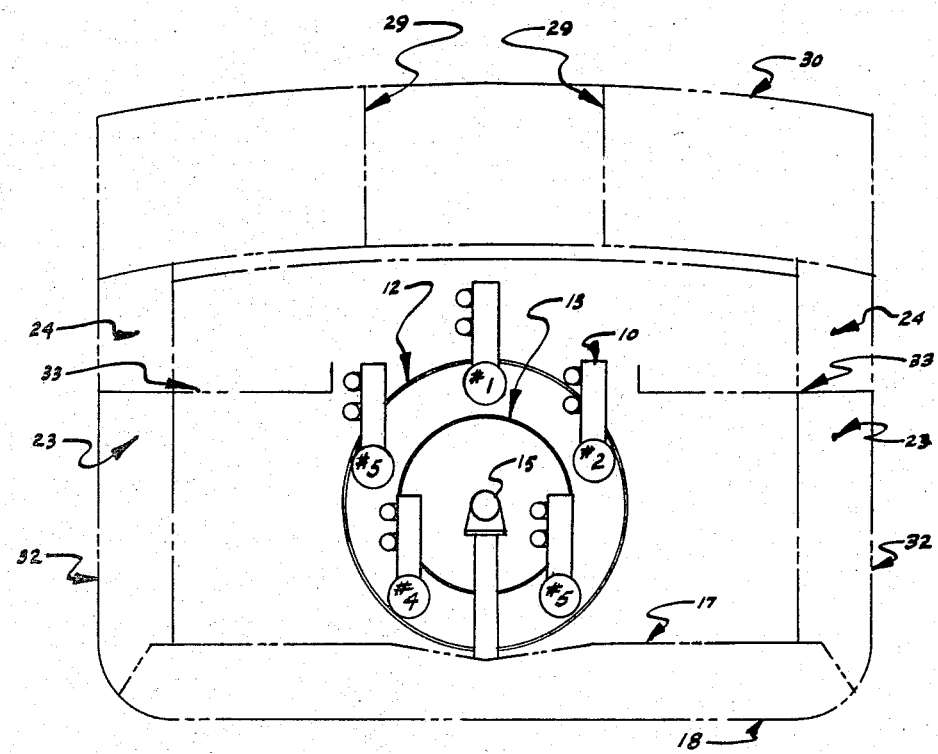
Fig. 2 is a cross section through the engine room of the ship.

In Fig. 2 the engines are spaced about the circle so that no one engine is over the other. This spacing permits pulling pistons without interference.

23 and 24 are hull tanks.

Figure 4:
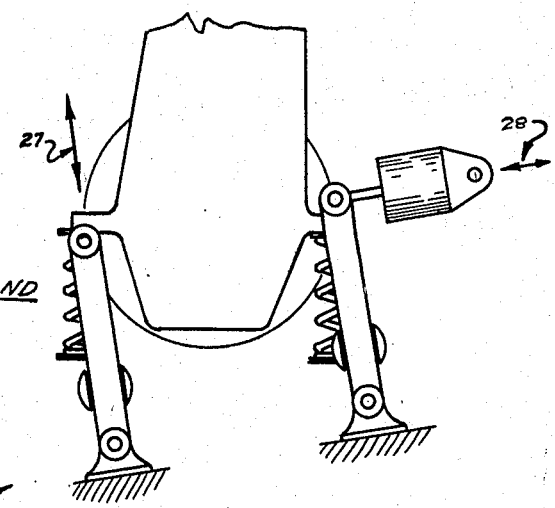
Fig. 4 is an end view showing the mounting of No. 2 engine in Fig. 2. No. 5 engine is the other hand.
Figure 5:
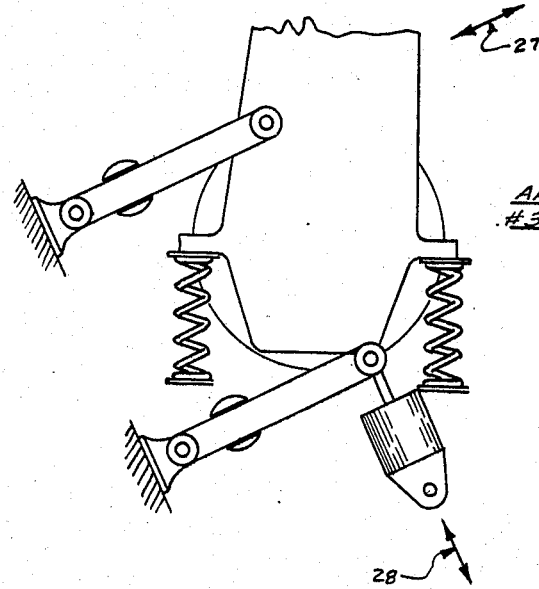
Fig. 5 is an end view showing the mounting of No. 3 engine in Fig. 2. No. 4 engine is the other hand.

In Figs. 3, 4 and 5:

27 is the driving force exerted between the engine unit and the driving wheel 12 or 13. The supporting links in all three arrangements are as will be seen in the drawings in line with said force 27. This eliminates any moments about the hinge axis which would change the contact pressure between the wheel 11 and 12 or 13 with a given oil pressure in cylinder 21.

28 is the movement of the engine unit in accomplishing the stop, ahead, or reverse maneuvering positions. This movement is at right angles to the tangent of the contact between wheel 11 and 12 or 13 and is therefore not affected by difference of throttle opening.

In Fig. 2:

29 is the engine room uptake, 30 is the main deck, 31 is the second deck, 32 is the side shell plating, 33 is the engine room flat, 17 is the tank top, and 18 is the bottom shell plating.

Any one of the engines may be hoisted vertically up the engine room uptake.

The arrangement described and shown provides a means of coupling a large number of Diesel engines to one propeller shaft. The small Diesels of an equivalent horsepower will weigh approximately half, will cost less than half, and in times of war will be procured much more quickly than the equivalent horsepower in the size of engine used in the conventional drive. This device employs engines small enough to be produced on a production line instead of requiring the large engines which are built one at a time.

The precise and expensive gears which require considerable time to produce are replaced by this quickly manufactured welded steel drum requiring little or no machining and a stock rubber tire now used on heavy factory trucks. The saving in weight and engine room floor space will also be considerable. In time of war the short time required to manufacture my drive wheel will be an advantage over the long period required to manufacture large reduction gears.

My invention also provides a resilient connection through a rubber to steel frictional contact which prevents the transmission of torsional vibration from engines to shaft, and eliminates the entire weight and cost of electric or hydraulic couplings used in the conventional drive.

The employment of the reversing ring eliminates the necessity of using a marine type or direct reversing Diesel engine. On smaller installations it will be possible to use automotive or tractor Diesels without their reverse gear. Having to stop and reverse the engines in a conventional drive requires that much more air storage and compressor capacity for maneuvering which would be eliminated entirely by my invention. Only enough capacity would be required to start a small percent of the propulsion engines by air at the beginning of the voyage. The others will be started by engagement. They could also be started one at a time electrically.

Maintaining the propulsion engines in a position radially half way between the driving and reversing ring frees them entirely from any drag or friction between the engines and propeller shaft, and provides a sailing clutch.

The arrangement described is capable of being installed in much less space than the equivalent horsepower of a conventional drive which uses either two or four large engines coupled to a reduction gear driving one propeller.

Having more engines increases the reliability of the drive at sea. One engine will be removed from service at sea with only a small percent of reduction of power. The small engines will be quickly repaired. The spares carried will be much less in weight and cost for the small engines than for conventional larger ones.

The narrower overall width of this multiple installation allows the building of tanks at the side of the engine room without reducing the conventional space required for pumps and auxiliaries. These tanks will render the same protection to the side of the engine room in case of attack in the event of war, as the double bottom does in accidental grounding on rocky bottom.

Not only will the invention described install in less space for a given horsepower than the conventional Diesel drive, but will install in the same size engine room as and with less weight than the same horsepower of steam using 500 R. P. M. Diesels compared with 450 pounds steam installation.

Mechanical positive means may be employed in maintaining the pressure between the rubber tire and the drive wheel in which case the drive wheel would need to be made quite accurately. By using hydraulic pressure to maintain the contact between the rubber tire and the drive wheel it is possible to have considerable variation in the radius of the drive wheel and still maintain the contact.

It may also be desirable to eliminate the reversing ring and use reversing engines. As will be apparent many combinations of the rubber tire and drum drive will be possible with small multiple Diesel engines. Therefore I claim as new:

1. The combination in a watercraft propulsion drive of a cylindrical drum rigidly connected to the propeller shaft driven by rubber tires which are rigidly connected to Diesel engines distributed about the inside circumference of said drum, the engines being hinged and the rubber tires being held in contact with the cylindrical drum by hydraulic cylinders or other mechanical means.

2. A system for driving the slow speed propeller shaft of a watercraft with a plurality of Diesel engines composed of a large driving drum rigidly connected to and supported by the propeller shaft, driven by a plurality of small rubber tires direct connected to and supported by a like plurality of small high speed Diesel engines spaced about the inside periphery of the large drum with a hinge device to control contact of the drum and rubber wheel.

3. A system for driving the slow speed propeller shaft of a watercraft with a plurality of Diesel engines composed of a large driving drum rigidly connected to and supported by the propeller shaft, driven by a plurality of small rubber tires direct connected to and supported by a like plurality of small high speed Diesel engines spaced about the inside periphery of the large drum with a self aligning hinged device substantially as shown to control contact of the drum and rubber wheel.

4. In a drive device, a driven shaft, a driving drum on said driven shaft, said driving drum having a driving ring thereon, an engine arranged adjacent to said shaft, and means to support said engine for movement towards and from the shaft, said engine having a driving wheel thereon, said driving wheel being mounted adjacent to said driving ring and movable to engage the driving drum.

5. In a drive device, a driven shaft, a driving drum on said driven shaft, said driving drum having an outer and an inner driving ring thereon, an engine arranged adjacent to said shaft, and means to support said engine for movement towards and from the shaft, said engine having a driving wheel thereon, said driving wheel being mounted between said driving rings and being movable with the engine to engage either ring.

6. In a drive device, a driven shaft, a driving drum on said driven shaft, said driving drum having an outer and an inner driving ring thereon, an engine arranged adjacent to said shaft, means to support said engine for movement towards and from the shaft, said engine having a driving wheel thereon, said driving wheel being mounted between said driving rings, and means for moving said engine towards and from said rings.

7. In a drive device, a driven shaft, a driving drum on said driven shaft, said driving drum having a driving ring thereon, a plurality of engines arranged about said shaft, means to support said engines for movement towards and from the shaft, each engine having a driving wheel thereon, said driving wheel being mounted adjacent to said driving drum, and means for moving said engines and their driving wheels towards and from said drum.

8. In a drive device, a driven shaft, a driving drum on said driven shaft, said driving drum having a driving ring thereon, a plurality of engines arranged about said shaft, means to support said engines for movement towards and from the shaft, each engine having a driving wheel thereon, said driving wheel being mounted adjacent to said driving drum, hydraulic means for urging said engines and their driving wheels in one direction and resilient means for urging said engines and their driving wheels in a reverse direction.

9. In a drive device, a driven shaft, a driving drum on said driven shaft, said driving drum having an outer driving ring thereon, said driving drum having an inner driving ring thereon and spaced from the outer driving ring, a plurality of engines arranged about said shaft, and means to support said engines for movement towards and from the shaft, each engine having a driving wheel thereon, said driving wheels having resilient tires thereon, said driving wheels being mounted between said driving rings.

10. In a drive device, a driven shaft, a driving drum on said driven shaft, said driving drum having an outer and an inner driving ring thereon, a plurality of engines arranged about said shaft, means to support said engines for movement towards and from the shaft, each engine having a driving wheel thereon, said driving wheels being mounted between said driving rings, means for moving said engines, said supporting means including for each engine pivoted links arranged to cause each engine to move inwardly and outwardly along a radial line from the axis of the driven shaft.

11. In a drive device a driven shaft, a driving drum on said driven shaft, said driving drum having radially spaced outer and inner driving rings thereon, a plurality of engines, means to support said engines for pivotal movement about the driven shaft, each of said engines having a driving wheel thereon, the direction of rotation of each engine being perpendicular to the direction of driving force.

12. In a drive device a driven shaft, a driving drum on said driven shaft, said driving drum having radially spaced outer and inner driving rings thereon, a plurality of engines, means to support said engines for pivotal movement about the driven shaft, each of said engines having a driving wheel thereon, the direction of movement of each engine being at right angles to the tangent of the contact between the engine driving wheels and the shaft driven wheels.

13. In a drive device a driven shaft, a driving drum on said driven shaft, said driving drum having radially spaced outer and inner driving rings thereon, a plurality of engines, means to support said engines for pivotal movement about the driven shaft, each of said engines having a driving wheel thereon, the direction of rotation of each engine being perpendicular to the direction of driving force and the direction of movement of each engine being at right angles to the tangent of the contact between the engine driving wheels and the shaft driven wheels.

14. In a drive device a driven shaft, a driving ring on said driven shaft, a plurality of engines disposed above said driven shaft, each engine having a driving wheel thereon, said wheels being arranged adjacent to said driving ring, means supporting each of said engines for movement towards and from the shaft, means for moving each engine towards and from the shaft, said engines each being disposed vertically and in spaced apart non-aligning relation whereby free access may be had to the top of each engine.

15. In a drive device, a driven shaft, a driving ring on said driven shaft, a plurality of engines disposed above said driven shaft, each engine having a driving wheel thereon, said wheels being arranged adjacent to said driving ring, means supporting each of said engines for movement towards and from the driven shaft, means for moving each engine towards and from the driving shaft, said engines being evenly distributed about the axis of said driven shaft, said engines being disposed vertically whereby free access may be had to the top of each engine.

16. In a drive device a driven shaft, spaced driving rings on said driven shaft, a plurality of engines disposed above said driven shaft, each engine having a driving wheel thereon, said wheels being arranged between said driving rings, a parallel link motion mechanism supporting each of said engines for movement towards and from the shaft, the plane of the pivots of the supporting links where they engage the respective engines being perpendicular to the direction of driving force of the engine and the direction of movement of each engine being at right angles to the tangent of contact between the driving wheels and the driving ring, resilient means normally urging each engine in one direction and hydraulic means normally urging each engine in a reverse direction, said engines being disposed vertically and in spaced apart non-aligning relation whereby free access may be had to the top of each engine.

17. In a drive device, a driven shaft, spaced driving rings on said driven shaft, a plurality of engines disposed above said driven shaft, each engine having a driving wheel thereon, said wheels being arranged between said driving rings, a parallel link motion mechanism supporting each of said engines for movement towards and from the driven shaft, the plane of the pivots of the supporting links where they engage the respective engines being perpendicular to the direction of driving force of the engine and the direction of movement of each engine being at right angles to the tangent of contact between the driving wheels and the driving ring, resilient means normally urging each engine in one direction and hydraulic means normally urging each engine unit in a reverse direction, said engines being evenly distributed about the axis of said driven shaft, said engines being disposed vertically and in spaced apart non-aligning relation whereby free access may be had to the top of each engine.

EDMUND G. GRANT.